United States Patent [19]

MacDonald

[11] Patent Number: 4,772,038

[45] Date of Patent: Sep. 20, 1988

[54] EXPANDABLE TRAILER

[76] Inventor: Nelson MacDonald, 1082 Route 271, St-Pierre-de-Broughton, Québec, Canada, G0N 1T0

[21] Appl. No.: 64,033

[22] Filed: Jun. 17, 1987

[30] Foreign Application Priority Data

Jun. 17, 1986 [CA] Canada .................................. 511760

[51] Int. Cl.⁴ .............................................. B62P 1/00
[52] U.S. Cl. .................................. 280/401; 280/656; 280/491 R
[58] Field of Search .................. 280/656, 43.15, 43.16, 280/42, 638, 400, 401, 456 R, 491 R, 414.1, 414.2; 180/906; 296/26, 27, 170, 171

[56] References Cited

U.S. PATENT DOCUMENTS

| 243,216 | 6/1881 | Conner | 280/638 |
|---|---|---|---|
| 2,248,080 | 7/1941 | Hathaway | 280/656 |
| 2,499,052 | 2/1950 | Brookins | 366/49 |
| 2,790,673 | 4/1957 | Zur Nieden | 296/171 |
| 4,350,222 | 9/1982 | Lutteke et al. | 180/906 |

*Primary Examiner*—John J. Love
*Assistant Examiner*—Richard Camby
*Attorney, Agent, or Firm*—Robert J. Koch

[57] ABSTRACT

Trailer of the type which can be widened out or retracted when required, made of a frame on which there is mounted a wheel assembly. The frame comprises a traction bar, a rear transverse member fixedly mounted at one end of the traction bar, a front traction member which is parallel to the rear traction member and is also fixedly mounted on the traction bar, along the latter, short of its opposed end. The portion of the traction bar between the front transverse member and the opposed end thereof constitutes a traction rod. A movable framework is disposed on both sides of the traction bar between the rear and front transverse members. The wheels of the trailer are mounted on the movable frameworks, which can laterally extend thereby widening out the trailer, or they can be retracted in the narrow position of the trailer. This trailer can easily be attached to a four- or three-wheeler of the sporting type and, when it is widened out, it can be used to carry the four- or three-wheelers. It is then merely necessary to attach it to a car or any other vehicle of the same type.

5 Claims, 1 Drawing Sheet

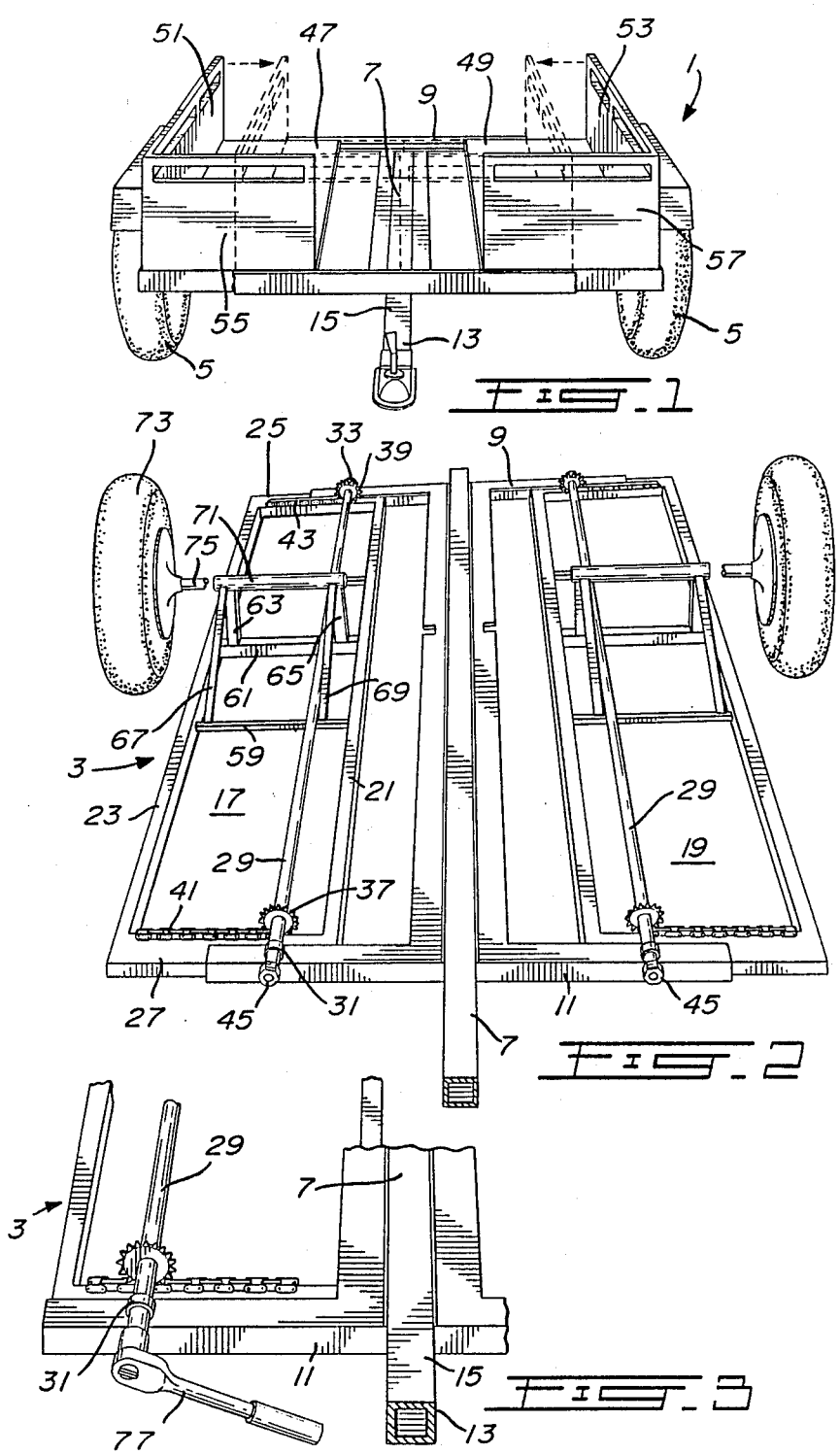

EXPANDABLE TRAILER

BACKGROUND OF INVENTION

1. Field of the Invention

The invention concerns an expandable trailer. More particularly, the invention is concerned with a trailer of the type which can be widened out or retracted when required. According to a specific application of the invention, in the retracted position, the trailer can be connected to a four- or three-wheeler of the so-called sorting type. In this case, the distance between the wheels of the trailer and those of the four- or three-wheelers should be the same. If the trailer according to the invention is intended to be used to carry the four- or three-wheeler, it is widened out, the four- or three-wheeler is mounted thereon, and the trailer is attached to a car or any other vehicle of the same type.

2. Description of Prior Art

It is known that the popularity of the four- or three-wheeler of the so-called sporting type is on the increase. Now, in view of the fact that it is often necessary to carry the four- or three-wheeler a certain distance for use in a sporting event or the like, it is often necessary to load the three- or four-wheeler on a trailer and to bring it to its destination. On the other hand, these vehicles of the so-called sporting type, whether they are four- or three-wheelers, may also be used to do certain light work, such as transportation. In this case, a trailer which can be fixed to the so-called sporting vehicle must be used. Now, in order to have a good result, the distance between the wheels of the trailer and that between the back wheels of the four- or three-wheeler should be substantially the same. Normally, this implies the use of two trailers, one serving to carry the vehicle of the sporting type, and the other one being capable of connection to the latter for carrying small objects.

It would therefore be of interest to be able to rely on a single vehicle which can be used simultaneously for transporting the four- or three-wheelers or to be connected to the latter.

The lateral spread of a trailer is already known from U.S. Pat. No. 2,248,080. However, the device of that patent provides for a complicated system and the lateral exit of extensions. U.S. Pat. No. 2,499,052 provides solely for the lateral spreading of the wheels by extending the axle. U.S. Pat. No. 2,790,673 provides for the lateral widening by using hydraulic jacks, folding bars, as well as extendable rods.

It is obvious that the mechanism of the prior art cannot be easily adapted to the needs mentioned above.

SUMMARY OF INVENTION

I have therefore provided a trailer of the type which can easily be widened or retracted depending on need. This trailer comprises a frame on which there is mounted a wheel assembly, the frame being characterized by the fact that it comprises a traction bar, a rear transverse member fixedly mounted at one end of the traction bar, a front transverse member which is parallel to the rear traction member and is fixedly mounted on the traction bar, along the latter, short of the opposite end of the traction bar. The portion of the traction bar between the front transverse member and the opposite end constitutes a traction rod. A movable framework is disposed on both sides of the traction bar between the rear and front traction members. The wheels of the trailer are mounted on the movable frameworks, and means are provided to permit a lateral extension of each of the movable frameworks and to widen out the trailer. These means also enable to retract the frameworks in the narrow position of the trailer.

According to a preferred embodiment of the invention, the movable frameworks comprise rectangular frames slidaly disposed on the rear and front transverse members.

According to another preferred embodiment of the invention, the rear and front transverse members are made of angle irons and the rectangular frames are slidably disposed on the angle irons.

According to another preferred embodiment of the invention, each rectangular frame comprises an internal lateral side, an external lateral side, front and rear sides, and means such as rack and pinion are associated with the rear and front sides.

According to another preferred embodiment of the invention, a freely rotatable rod is mounted below the rear and front transverse members, a rod being provided on each side of the traction bar, and at equal distance to the latter, two pinions are fixedly mounted on each of the rods, the first pinion being fixed on the rod to be inside the rectangular frame, adjacent the rear side, the second pinion being also fixedly mounted on the rod to be inside the rectangular frame, adjacent the front side, a first rack is fixedly mounted along the rear side and a second rack is fixedly mounted along the front side, each of the racks engaging with a respective pinion, a free end of each of the rods exceeding one of the transverse members, each free end being shaped to receive a key capable of causing the rotation of each rod and consequently the extension or the retraction of each frame, to widen or retract the trailer.

According to another preferred embodiment of the invention, a floor is provided on each of the rectangular frames so as to constitute a single surface in the narrow position of the trailer, but two separate surfaces, spaced from one another, in the widened position of the trailer.

According to another preferred embodiment of the invention, the trailer comprises at least two lateral walls fixedly mounted on the external lateral sides of the two rectangular frames, and two front walls fixedly mounted on the front side of the two frames.

According to another preferred embodiment of the invention, the trailer comprises two support elements fixedly mounted between each of the external and internal lateral sides of each frame, two holding bars, perpendicular to one of the two support elements, project under each frame, a holding rod connects the lower extremity of each holding rod to the other support element, an axle box is disposed between the lower ends of the two holding bars, the wheels being each provided with an axle, which is introduced in one of the axle boxes.

BRIEF DESCRIPTION OF DRAWINGS

The invention will now be described by reference to the enclosed drawings illustrating an embodiment thereof, which is given without the intention of limiting the scope of the invention thereto, and wherein:

FIG. 1 is a perspective view illustrating a trailer according to the invention in widened out position;

FIG. 2 is a perspective view from underneath showing the trailer according to the invention in widened out position as well as two wheels with an axle for this trailer;

FIG. 3 is a partial perspective view illustrating the frame of the trailer in retracted position.

DESCRIPTION OF PREFERRED EMBODIMENTS

Referring now to the drawings, more particularly to FIG. 1, there is illustrated a trailer 1 of the type which can be widened out as shown in FIG. 1, as well as in FIG. 2, or can be retracted according to need, as shown in FIG. 3, it being understood that the latter figure relates only to the mechanism involved in the invention. As in all conventional trailers, the trailer according to the invention comprises a frame 3 (FIGS. 2 and 3) on which there is mounted a wheel assembly 5 (FIGS. 1 and 2). The frame 3 is mainly formed of a traction bar 7, a rear transverse member 9, mounted in known manner, as shown in FIGS. 1 and 2, at the rear end of the traction bar 7. On the other hand, a front transverse member 11, which is parallel to the rear transverse member 9, is fixedly mounted on the traction bar 7, along the latter, short of the opposite end thereof. It will be realized that the portion of the traction bar between the front traction member 11 and the opposite end 13 constitutes a traction rod 15. As will be seen in FIGS. 2 and 3, each of the rear and front transverse members 9 and 11 is made of angle irons, and the reason therefor will be given later.

The frame also comprises two movable rectangular frames 17 and 19. As will be seen in FIG. 2, these movable frames 17 and 19, which will be described in more detail later, are slidably disposed on the angle irons, defining the rear and front transverse members 9 and 11 on both sides of the traction bar 7. The two rectangular frames are symmetrical and it will be sufficient to describe one only, such as frame 17. The latter comprises an internal lateral side 21, an external lateral side 23, a rear side 25, as well as a front side 27, all of which are connected together such as by welding, to form a highly rigid rectangle.

A rotatable rod 29 is freely mounted, by means of sleeves 31 and 33, under the rear and front transverse members 9 and 11, and are fixed thereto. Such a rod is obviously provided on both sides of the traction bar 7, and at an equal distance to the latter. Two pinions 37, 39 are fixedly mounted, in known manner, on each rod 29. The first pinion 37 is fixedly mounted on the rod to be located inside the rectangular frame 19, as will be seen in FIGS. 2 and 3, adjacent the side 27 of the frame 17. With respect to the second pinion 39, it is similarly fixedly mounted, on rod 29, to be located inside the rectangular frame 17, but adjacent the rear side 25. A rack 41, which can for example be constituted of a conventional chain, is fixed along the front side 27, while a rack 43, similar to rack 41, is fixed along the rear side 25 of the frame 17. Both racks 41 and 43 should obviously mesh with a respective pinion 37,39.

A free end 45 of each of the rods 29 exceeds the front transverse member 11, and each of these free ends is designed to receive a key, such as a driving ratchet, capable of rotating each rod 29 and, consequently, provoking the extension or the retraction of both frames 17, 19, to widen (FIG. 2) or retract (FIG. 3) the trailer 1.

As shown in FIG. 1, a floor 47,49 covers each of the rectangular frames 17,19, so as to constitute a single surface, while the trailer 1 is in the narrow position, but two separate surfaces, spaced one from the other, in widened out position of the trailer. Moreover, lateral walls 51,53 are fixedly mounted in known manner to the lateral external sides 23 of the two rectangular frames 17, 19 and front walls 55,57 are fixedly mounted, in known manner, to the front sides 27 of the two frames 17,19.

Finally, a specific device is provided to mount the wheels. This device comprises two support members 59,61 (FIG. 2) fixedly mounted between each lateral internal and external side 21 and 23, of each frame 17, 19, two holding bars 63,65 are connected to the support member 61, perpendicularly therewith, so as to project under the frames 17,19. A holding rod 67, 69 connects the lower end of each holding bar 63,65 to the support member 59. Finally, an axle box 71 is disposed between the lower ends of the two holding bars 63,65. Each wheel 73 is provided with a partial axle 75 which is introduced in known manner in the axle box 71 and is retained therein, also in known manner.

Therefore, if the trailer is intended to be used for carrying small objects, it is merely necessary to hook it behind a four- or three-wheeler, not illustrated, in a position as illustrated in FIG. 3. On the other hand, if it is desired to carry a four- or three-wheeler, it is merely necessary to extend the frames by means of the key 77, in the position as illustrated in FIGS. 1 and 2 of the drawings and to load the sporting vehicle thereon.

I claim:

1. Trailer of the type which can be widened out or retracted when required, comprising a frame structure on which a wheel assembly is mounted, said frame structure comprising a traction bar, a rear transverse member fixedly mounted at one end of said traction bar, a front transverse member which is parallel to said rear traction member and is fixedly mounted on said traction bar short of the opposite end of said traction bar, the portion of said traction bar between the front transverse member and said opposite end of said traction bar defining a traction rod, each of the rear and front transverse members being made of angle irons, a movable rectangular frame being slidably disposed on said front end rear transverse members, in said angle irons, on both sides of said traction bar, each rectangular frame having an internal lateral side, an external lateral side, a rear side and a front side, a freely rotatable rod mounted below said rear and front transverse members, one said freely rotatable rod being provided on each side of said traction bar and at an equal distance to the latter, two pinions fixedly mounted on each of said freely rotatable rods, the first pinion being mounted on said rod so as to be outside said rectangular frame, in adjacent position with respect to the rear side, the second pinion being also mounted on said rod inside said rectangular frame, adjacent said front side, a first rack being fixedly mounted along said front side, each said racks meshing with a respective pinion, a free end of each rod exceeding one of said transverse members, each free end being designed to receive a key capable of causing rotation of each rod and consequently extension or retraction of each frame, to widen out or retract said trailer.

2. Trailer according to claim 1, which comprises a floor covering each rectangular frame so that is constitutes a single surface in the narrow position of said trailer, but two separate surfaces, spaced from one another, in the widened out position of said trailer.

3. Trailer according to claim 2, comprising at least lateral walls fixedly mounted on the external lateral sides of said two rectangular frames, and front walls fixedly mounted on the front sides of the two frames.

4. Trailer according to claim 1, which comprises two support members fixedly mounted between each of the external and internal lateral sides of each frame, two holding bars which are perpendicular to one of the two support members projecting under each said frame, a holding rod connecting the lower end of each holding bar to the other support member, an axle box disposed between the lower ends of the two holding bars, each wheel being provided with an axle, said axle being introduced in one said axle box.

5. Trailer of the type which can be widened out or retracted when required, comprising a frame structure on which a wheel assembly is mounted, said frame structure comprising a traction bar, a rear transverse member fixedly mounted at one end of said traction bar, a front transverse member which is parallel to said rear traction member and is fixedly mounted on said traction bar short of the opposite end of said traction bar, the portion of said traction bar between the front transverse member and said opposite end of said traction bar defining a traction rod, each of the rear and front transverse members being made of angle irons, a movable rectangular frame being slidably disposed on said front and rear transverse members, in said angle irons, on both sides of said traction bar, each rectangular frame having an internal lateral side, an external lateral side, a rear side and a front side, a freely rotatable rod mounted below said rear and front transverse members, one rod being provided on each side of said traction bar and at an equal distance to the latter, two pinions fixedly mounted on each of said rods, the first pinion being fixedly mounted on said rod to be outside said rectangular frame, adjacent to the rear side, the second pinion being also fixedly mounted on said rod inside said rectangular frame, adjacent said front side, a first rack being fixedly mounted along the rear side and a second rack being fixedly mounted along the front side, each said racks meshing with a respective pinion, a free end of each of said rods exceeding one of said transverse members, each free end being designed to receive a key capable of causing rotation of each rod and consequently extension or retraction of each frame, to widen out or retract said trailer, a floor covering each of said rectangular frames so as to constitute a single surface when the trailer is in the narrow position, but two separate surfaces, spaced from one another, in the widened out position of said trailer, at least the lateral walls being fixedly mounted on the external lateral sides of the two rectangular frames and front walls fixedly mounted on the front sides of said frames, two support members fixedly mounted between each said external and internal lateral sides of said frame, two holding bars perpendicular to one of said support elements projecting underneath each said frames, a holding rod connecting the lower end of each said holding bars to the other support member, an axle box disposed between the lower ends of the two holding bars, said wheels each being provided with an axle, said axle being introduced in one said axle box.

* * * * *